(12) United States Patent
You et al.

(10) Patent No.: US 7,436,481 B2
(45) Date of Patent: Oct. 14, 2008

(54) LIQUID CRYSTAL DISPLAY DEVICE HAVING DIGITIZER AND METHOD FOR FABRICATING THE SAME

(75) Inventors: Dong Jac You, Kyongsangbuk-do (KR); Jung Hee Lee, Kyongsangbuk-do (KR); Nam Do Son, Kyongsangnam-do (KR); Sung Hoon Lee, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 153 days.

(21) Appl. No.: 10/736,665

(22) Filed: Dec. 17, 2003

(65) Prior Publication Data

US 2004/0125312 A1 Jul. 1, 2004

(30) Foreign Application Priority Data

Dec. 26, 2002 (KR) .................. 10-2002-0084457
Mar. 28, 2003 (KR) .................. 10-2003-0019578
Mar. 28, 2003 (KR) .................. 10-2003-0019580

(51) Int. Cl.
*G02F 1/1345* (2006.01)
(52) U.S. Cl. .................. 349/150; 349/58; 349/60
(58) Field of Classification Search .............. 349/150, 349/58, 60
See application file for complete search history.

(56) References Cited

U.S. PATENT DOCUMENTS

| | | | | |
|---|---|---|---|---|
| 5,274,198 A | * | 12/1993 | Landmeier | 178/18.08 |
| 5,336,535 A | * | 8/1994 | Fukuchi et al. | 428/1.32 |
| 5,670,994 A | * | 9/1997 | Kawaguchi et al. | 345/206 |
| 5,984,294 A | * | 11/1999 | Bogomolny | 269/289 R |
| 6,388,729 B2 | * | 5/2002 | Ahn et al. | 349/190 |
| 6,597,416 B1 | * | 7/2003 | Momose | 349/60 |
| 6,661,399 B1 | * | 12/2003 | Oh et al. | 345/87 |
| 2002/0101399 A1 | | 8/2002 | Kubo et al. | |

FOREIGN PATENT DOCUMENTS

| | | |
|---|---|---|
| JP | 05-224223 | 9/1993 |
| JP | 09-115378 A | 5/1997 |
| JP | 10-0631419 | 3/1998 |
| JP | 11-195855 | 7/1999 |
| JP | 2002-131724 | 5/2002 |
| KR | 10-20010003038 A | 1/2001 |
| WO | WO 02/056100 A1 | 7/2002 |

\* cited by examiner

*Primary Examiner*—David Nelms
*Assistant Examiner*—Phu Vu
(74) *Attorney, Agent, or Firm*—McKenna Long & Aldridge LLP (57) ABSTRACT

A liquid crystal display device having a digitizer and a method for fabricating the same are disclosed in the present invention. The liquid crystal display device includes a liquid crystal display device module, a printed circuit board located in close proximity to a support main of the liquid crystal display device module, and a fixing device to insert a digitizer.

12 Claims, 8 Drawing Sheets

LIQUID CRYSTAL DISPLAY DEVICE HAVING DIGITIZER AND METHOD FOR FABRICATING THE SAME

This application claims the benefit of the Korean Patent Application Nos. P2002-084457 filed on Dec. 26, 2002, and P2003-019578 and P2003-019580 both filed on Mar. 28, 2003, which are hereby incorporated by reference.

BACKGROUND OF THE INVENTION

1. Field of the Invention

The present invention relates to a liquid crystal display device, and more particularly, to a liquid crystal display device having a digitizer and a method for fabricating the same. Although the present invention is suitable for a wide scope of applications, it is particularly suitable for providing a fixing device for fixing the digitizer to a liquid crystal display module for improving an operation efficiency and providing a stable composition in the process of assembling the liquid crystal display module and the digitizer.

2. Discussion of the Related Art

Resolution of liquid crystal display (hereinafter referred to as "LCD") devices has been rapidly developed by the improvement of liquid crystal materials and micro fabrication technology with their characteristics of lightweight, thin profile, and low power consumption. Also, the liquid crystal display device has been widely used in various applications. For example, the LCD device is used as a display device of a notebook personal computer (hereinafter referred to as "NTPC"). The NTPC is slim and lightweight, so that the user can use information on the move. Among video display devices applied to various display devices, particularly, the liquid crystal display module (hereinafter referred to as "LCM") including a backlight unit and a liquid crystal display panel, which is a flat-panel display, will now be explained.

Figure 1:
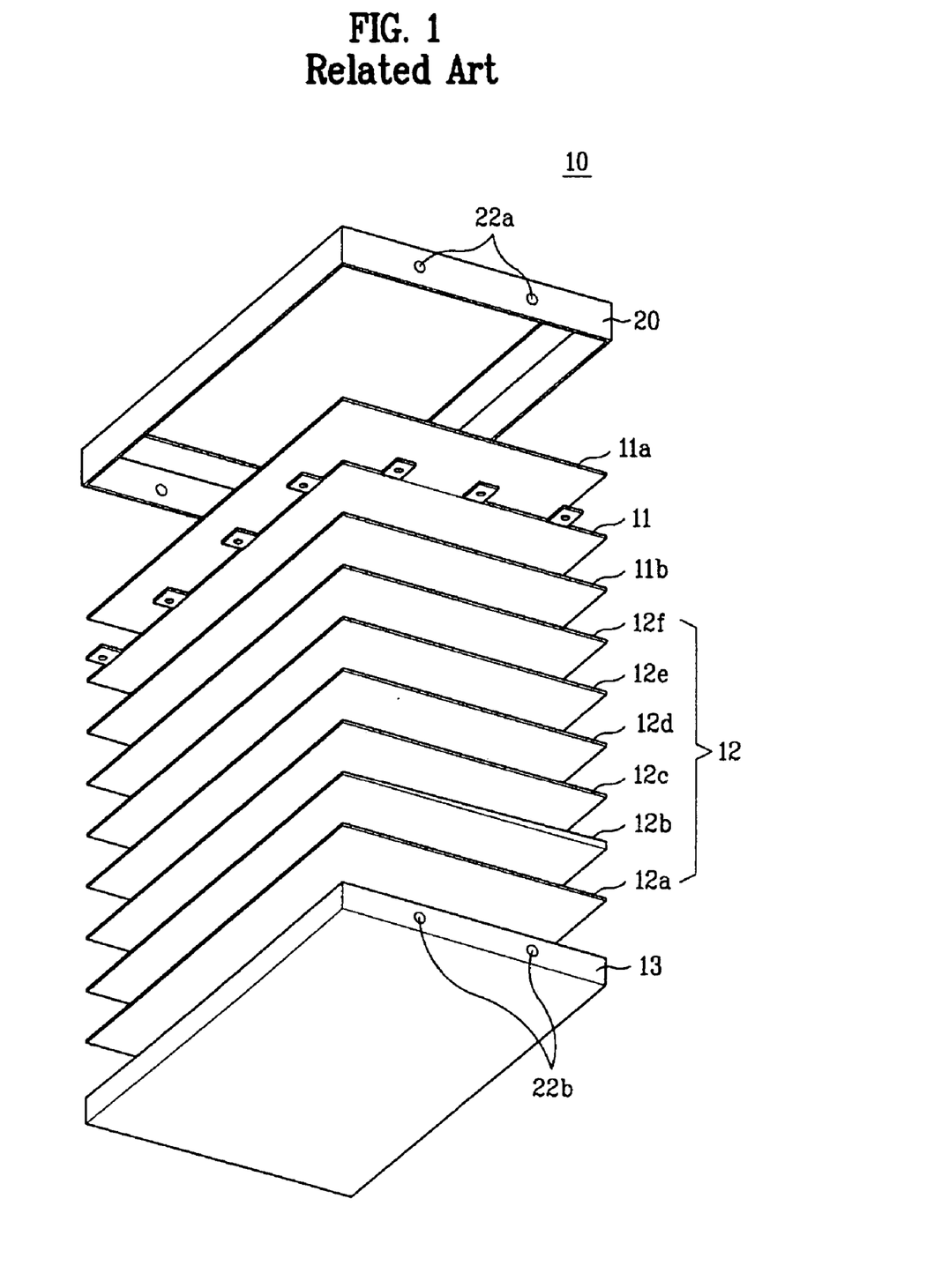
FIG. 1 is an expanded view of the related art liquid crystal display device.

FIG. 1 is an expanded view of the related art liquid crystal display device. As shown in FIG. 1, the liquid crystal display module 10 includes a backlight unit 12 and a liquid crystal display panel 11.

The backlight unit 12 includes a light source (not shown) radiating light, a reflecting plate 12a reflecting light from the light source in one direction, a light guiding plate 12b guiding light from the light source to the entire surface of the liquid crystal display panel, a first diffusing or protective sheet 12c, a first prism sheet 12d, a second prism sheet 12e, and a second diffusing or protective sheet 12f. Each of the polarizing plates 11a and 11b is provided at both sides of the liquid crystal display panel 11.

The backlight unit 12 and the liquid crystal display panel 11 are supported by a support main 13 and a top case 20. More specifically, the reflecting plate 12a, the light guiding plate 12b, the first diffusing or protective sheet 12c, the first prism sheet 12d, the second prism sheet 12e, and the second diffusing or protective sheet 12f are stacked on the upper surface of the support main 13 of a plastic material. The liquid crystal display panel 11 having the polarizing plates 11a and 11b on each surface thereof is stacked on the diffusing or protective sheet 12f. The liquid crystal display panel is coupled with the top case 20 formed of steel at the top and is supported by the support main 13 at the bottom.

Recently, high resolution of a liquid crystal display device is realized with the improvement of LCD technology, and thus, a high-resolution graphic work can be realized. Therefore, a touch panel is also used as an input device in the NTPC. Also, the touch panel provided in the NTPC can be applied to a device performing the same function as a touch screen of a cathode ray tube (CRT) used in a desktop computer.

The touch panel provided in the NTPC can be classified into a resistive film type, an electrostatic capacitance type, and an electromagnetic (EM) type depending upon the method of searching a user-directed position.

The touch panel of the resistive film type detects a position of a touching point by the change of an output current when a direct current voltage is applied to the touch panel. The touch panel of the electrostatic capacitance type detects the position of the touching point by using capacitance coupling when an alternating current voltage is applied to the touch panel. The electromagnetic type detects the position of a touching point by detecting a resonance frequency when a magnetic field is applied to the touch panel.

Since each type has different characteristics of a signal amplification problem, a resolution difference and a different degree of difficulty in design and technology, a specific type should be chosen for merit. Optical, electrical, mechanical, weather resistant and input characteristics as well as endurance and economical efficiency should be considered in choosing a specific type.

The development of the EM type touch panel draws attention due to its distinction of the accurate position among the touch panels. The EM touch panel includes a digitizer having two sets of array coils, one set of which is parallel to the other set, and an electronic pan handing in a position on the digitizer.

Figure 2:
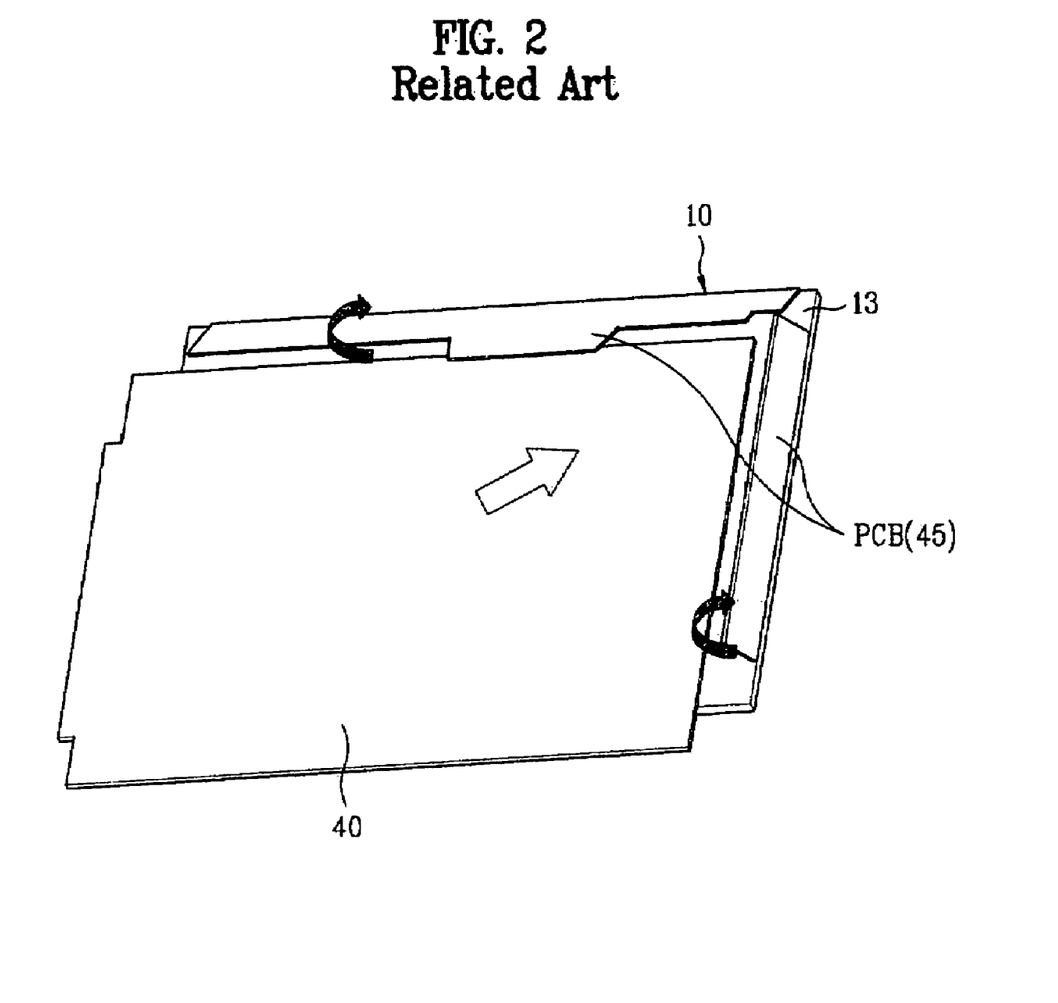
FIG. 2 is a schematic view of the related art liquid crystal display device having the electromagnetic touch panel.

Hereinafter, the related art electromagnetic touch panel will be explained with reference to the accompanying drawings. FIG. 2 illustrates a schematic view of the related art liquid crystal display device having the electromagnetic touch panel.

As shown in FIG. 2, the related art liquid crystal display device having an electromagnetic touch panel includes a liquid crystal display panel 11 having upper and lower substrates, a liquid crystal layer between the upper and lower substrates to display a video signal according to scan signals and data, a backlight unit 12 radiating light and uniformly irradiating the light at a rear portion of the liquid crystal display panel, a sensor unit 29 sensing a touched position by receiving a resonance frequency in accordance with the position where an electronic pen 39 is touched, a control unit 15 controlling the sensor unit 29, a top case (shown in FIG. 1) supporting the liquid crystal display panel 11, the backlight unit 12, the sensor unit 29, and the control unit 15 with a single body, and an electronic pen 39 communicating with the sensor unit 29 by transmitting and receiving the resonance frequency.

The sensor unit 29 and the control unit 15 are referred to as an electromagnetic touch panel or a digitizer. Although it is not shown, a passivation layer spaced apart from the liquid crystal display panel 11 and protecting the liquid crystal display panel 11 is further included at a top portion of the liquid crystal display panel 11.

The sensor unit 29 includes a sensor printed circuit board (PCB) having a plurality of X-axis coils and Y-axis coils, a shield plate blocking electromagnetic wave at a bottom portion of the sensor PCB and a connector having a switching device for directing transmission and receiving modes of the sensor PCB and choosing the X or Y axis coils.

The control unit 15 located at the bottom portion of the sensor unit 29 includes a control processor unit sending a signal to the sensor unit 29 and reading the input signal so as to detect the position of the electronic pen 39. The electronic pen 39 includes a resonance circuit having a coil and a condenser therein.

Figure 3:
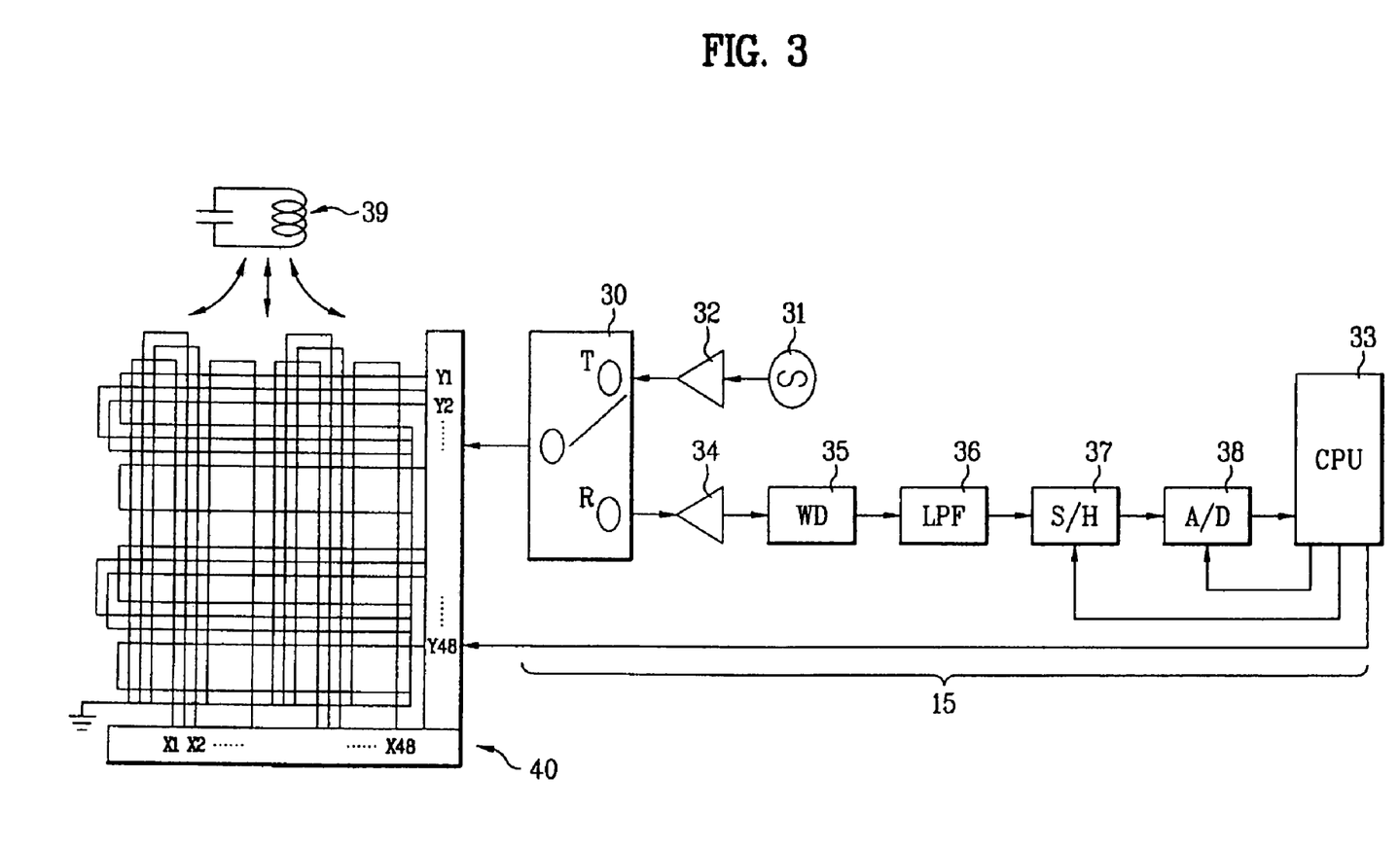
FIG. 3 is a block diagram illustrating a driving circuit of the related art electromagnetic digitizer.

The structure of the digitizer including the sensor unit and the control unit will be explained as follows. FIG. 3 is a block configuration diagram illustrating a driving circuit of an electromagnetic digitizer. As shown in FIG. 3, the sensor unit 29 of the digitizer 40 includes X-axis and Y-axis coil arrays and X-MUX and Y-MUX coupled to the X-axis and Y-axis, respectively. A specific Y-axis coil is chosen by a Y address signal (Y-ADDR), and a specific X-axis coil is chosen by an X address signal (X-ADDR) for reading. Herein, both X and Y address signals are generated from the control unit 15.

A sine wave and an electron wave are sent to the X-axis and the Y-axis by the control unit 15, and the output signals from the X-axis and Y-axis coil are sent to the control unit 15. The control unit 15 includes a sine wave generator 31 generating and sending the sine wave to the coils, an amplifier 32 amplifying the sine wave generated from the sine wave generator 31, a switch 30 sending the amplified sine wave to the coil or sending a signal from the coil to the control unit 15, an amplifier 34 differentially amplifying an output signal generated from the coil by the switch 30, a wave detector 35 (WD) detecting waves from the amplifier 34, a low pass filter 36 filtering the output signal generated from the wave detector 35, a sample and hold unit 37 (S/H) sampling, holding, and outputting a signal generated from the low pass filter 36, an analog-digital converter 38 converting size and polarity of an analog signal outputted from the sample and hold unit 37 to a digital format and outputting the digital signal, and a processor 33 reading the output signals from the analog-digital converter 38 for locating the position of the electronic pen 39 and controlling every unit. While the analog-digital converter 38 is digitizing a measured value of a coil, the sample and hold unit 37 holds the value, and a subsequent second coil begins to measure a sine wave in the previous circuits.

The digitizer 40 includes a plurality of coils overlapping the flexible surface of the PCB. Each coil is arrayed with respect to the X-axis and the Y-axis, and has one side connected to the ground voltage and the other side connected to a MUX unit to apply to an electric potential line of a fixed level.

The operation of the electromagnetic touch panel is as follows. The sine wave generated from the sine wave generator 31 by a control signal of the processor 33 is transmitted to the sensor unit 29 through the amplifier 32 and the switch 30. The sensor unit 29 chooses an X-axis coil and a Y-axis coil to generate an electromagnetic wave by inducing an electromagnetic wave. The electronic pen 39 is resonated, the resonant frequency is held for a predetermined period of time, and the sensor unit 29 receives the electromagnetic wave generated from the electronic pen 39.

The electronic pen 39 includes the resonance circuit. The resonance circuit is an RLC resonant circuit in which the maximum electric current flows at a specific frequency of an applied voltage. The resonant frequency can be expressed to show output characteristics at a specific resonant frequency. In other words, the resonant frequency (f) is expressed as a mathematic formula as $$f = \frac{1}{2\pi\sqrt{LC}},$$

wherein, L represents an inductance of a coil and C is a capacity of the condenser.

Depending upon the position of the electronic pen 39, each sine wave voltage having a different value is induced to each coil arrayed in the sensor unit 29 and inputted into the processor 33 through the wave detector 35 and the analog-digital converter 38.

The processor 33 calculates the value of the position of the electronic pen 39 on the digitizer 40 from the value induced to the coil and outputs an angle value between 0 and 360 degrees. The output data of the electronic pen 39 are stored in the processor 33.

It is convenient for a user to draw a figure when an area of the electromagnetic digitizer is larger and more efficient when the resolution is higher. The resolution is inversely proportional to the gaps between each coil in the digitizer 40. That is, when the gaps between the coils are narrower, the resolution becomes higher.

The electromagnetic touch panel using a completely different method from the resistant film type detects the exact position of the electronic pen by using the characteristic of an electromagnetic field being induced and resonated. The electromagnetic touch panel uses a stable method, which does not influence the image quality, and includes the sensor unit and the control unit at the rear portion of a display device so as to have a high transmittance of the display device. The electromagnetic touch panel is not influenced by a mere hand touch but only by the touch of a pen, and the writing is as natural as handwriting. Therefore, it is used in design works, academic presentations, and seminars.

Figure 4:
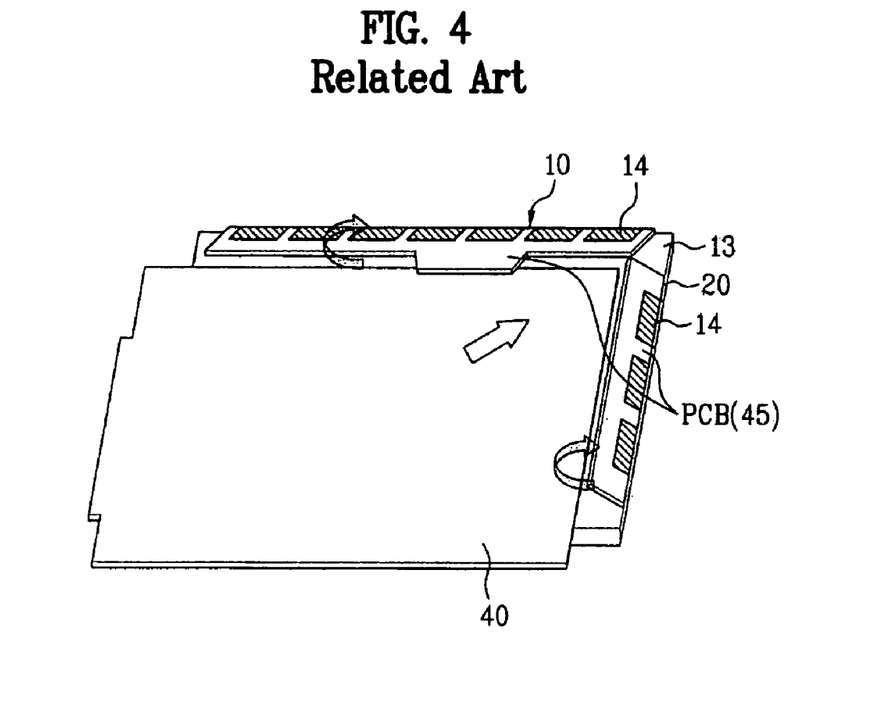
FIG. 4 is a rear view of the related art digitizer assembled into the liquid crystal display module.

Meanwhile, FIG. 4 is a rear view of the digitizer provided in the liquid crystal display module. In general, a printed circuit board 45 (hereinafter referred to as "PCB") is provided at the rear surface of the support main 13 at the bottom of the liquid crystal display module 10. A drive integrated circuit (hereinafter referred to as "D-IC") for driving a gate line and a data line of the liquid crystal display panel is provided at the PCB 45. And, the liquid crystal display module 10 and the PCB 45 having the D-IC are electrically connected by a tape carrier package 14 (hereinafter referred to as "TCP"), so as to send a control signal of the D-ICs (a gate line driving signal) and a video signal (a data line driving signal) to each gate line and data line of the liquid crystal display panel. Although there are some differences depending upon the products, a PCB 45a having a drive IC for driving the data line is connected to the TCP 14 at a corner in the long axis direction of the liquid crystal display panel and the PCB 45b having the drive IC for driving the gate line at a corner in the shorter axis direction of the liquid crystal display panel.

Accordingly, the LCM is driven by a control signal and a video signal of the D-IC provided at the PCB 45 and changes the structure of the alignment of liquid crystals. A picture corresponding to the video signal is displayed by a light channel formed according to the alignment of liquid crystals on the liquid crystal display device.

Therefore, when the digitizer is formed at the rear portion of the LCM, it is desirable that the electro-magnetically uniform LCM is arrayed on the top portion of the digitizer and an electro-magnetically uneven material in an irregular form, such as PCB, is provided on the bottom portion of the digitizer.

An assembling method for a liquid crystal display device having an EM type touch panel, as shown in FIG. 4, is to insert the digitizer between the support main 13 and the PCB 45 after the LCM 10 is assembled, the PCB 45 having a drive IC for driving the liquid crystal display panel. When inserting the digitizer, as shown in FIG. 4, the PCB 45 should be lifted upward and the digitizer is fixed to the PCB 45 at the predetermined position to reduce damage in the TCP 14 electrically connecting the PCB 45 to the liquid crystal display module 10 (shown in FIG. 4 as arrows)

However, there are problems in lifting the PCB 45 and fixing the digitizer, which will be described as follows. First, when the digitizer 40 is fixed, the inserted digitizer, the PCB 45, and the TCP 14 are contacted and damaged, thereby increasing product deficiency. Also, when the PCB 45 and the TCP 14 are lifted to insert the digitizer, the TCP 14 connected to the PCB 45 is contacted with the top case 20 and cracked. Particularly, product deficiency is increased when the PCB 45 is provided at both corners of the long and short axis directions of the liquid crystal display panel. Furthermore, when an end portion of the top case 20 has a burr having a sharp end because an end due to the deficient end portion of the top case contacting the TCP, the damage of the TCP is accelerated.

Second, the PCB is fastened with a screw leaving a necessary space between the support main and the PCB so as to insert the digitizer into the space according to the related art. The LCD becomes larger in size to provide an extra space for fixing the LCM with a screw, thereby producing a lightweight and slim size LCD without having a digitizer provided thereto.

Therefore, when the digitizer is inserted between the LCM and PCB, there is a problem in that the PCB should be lifted and the PCB and the TCP are damaged, thereby increasing product deficiency.

SUMMARY OF THE INVENTION

Accordingly, the present invention is directed to a liquid crystal display device having a digitizer and a method for fabricating the same that substantially obviate one or more of problems due to limitations and disadvantages of the related art.

Another object of the present invention is to provide a liquid crystal display device having a digitizer and a method for fabricating the same having a stable and productive structure in inserting digitizer in LCM.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display device module, a printed circuit board located in close proximity to a support main of the liquid crystal display device module, and a fixing device to insert a digitizer.

Herein, the fixing device is formed of a polyethylene terephthalate (PET) film and is formed in a thin pocket shape.

The fixing device is adhered by a double-faced tape so as to be fixed at a bottom surface of the support main.

The fixing device is also provided between the support main at a rear portion of the liquid crystal device module and the printed circuit board.

The fixing device has a U-shaped end portion in contact with the printed circuit board.

The fixing device comprises a covering part located along a surface of the printed circuit board, and a floor part adhered to a rear side of the support main.

The covering part is coated with a color different from the floor part.

The color is printed at an edge of the covering part.

The covering part and the floor part of the fixing device are formed as a single body.

The covering part of the fixing device is separated apart from the surface covered by the printed circuit board to prevent the inserted digitizer from contacting the printed circuit board.

The edge of the covering part is rounded along the surface of the printed circuit board.

The floor part of the fixing device is adhered by a doubled-faced tape and fixed at the rear side of the support main.

In another aspect of the present invention, a liquid crystal display device includes a support main supporting a liquid crystal display panel displaying a picture and a backlight unit supplying light to the liquid crystal display panel, a top case covering along an upper edge of the liquid crystal display panel, one or more printed circuit boards provided at a bottom surface of the support main to drive the liquid crystal display panel, a fixing device provided along a surface of the printed circuit board between the printed circuit board and the support main, an electromagnetic type digitizer coupled to the fixing device and detecting coordinates, and one or more fixing boards having an end portion coupled to a bottom surface of the top case and being bent to be parallel to the support main so as to secure the printed circuit board.

The fixing board is a board having a thickness thin enough to be bent by a pressure so as to be formed in a ']' shape by a plastic deformation.

The fixing board and the top case are formed of an electrical conductor.

The fixing board is bent to be in contact with a grounding unit of the printed circuit board.

The support main has a projected unit near a bent portion of the fixing board to guide bending of the fixing board.

The fixing board is secured to an inner surface of the top case by welding.

The fixing board and the top case are formed as a single body.

In a further aspect of the present invention, a method of fabricating a liquid crystal display device having a digitizer includes attaching one or more fixing boards having an end portion to a top case to be extended to a rear side of a support main, adhering a fixing device for inserting a digitizer to the rear side of the support main, wherein the fixing device is formed in a pocket shape and has a flat receiving part along surfaces of printed circuit boards at a bottom surface of the support main, inserting an electromagnetic type digitizer into the fixing device, and securing the fixing board into the printed circuit board by pressing the printed circuit board to bend and change a shape of the fixing board in a ']' shape by a plastic deformation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 5:
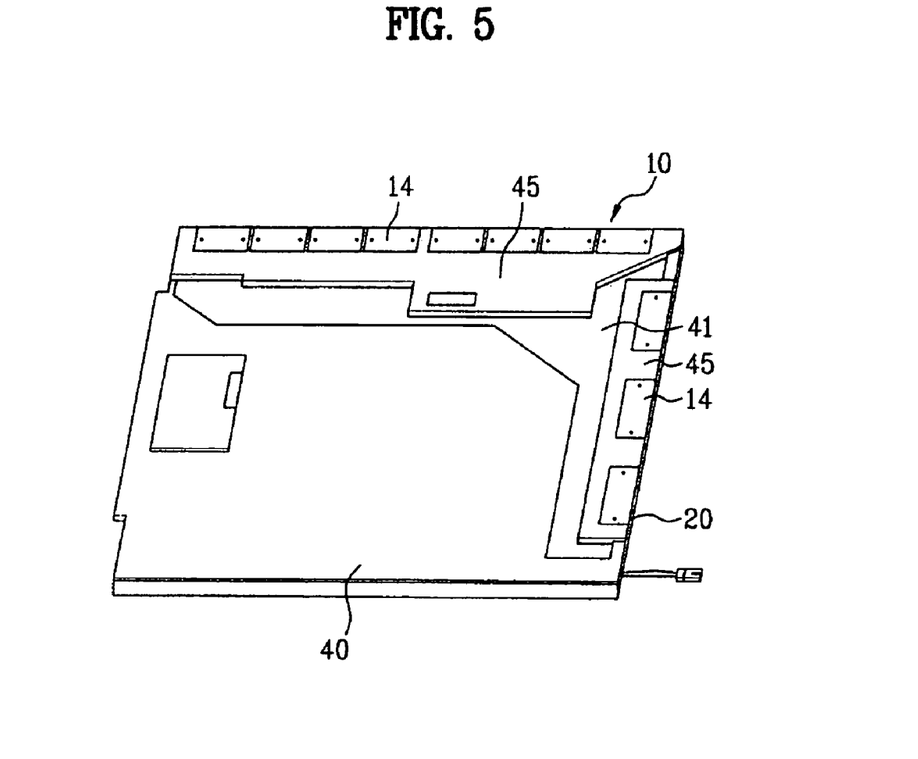
FIG. 5 is a plane view of a digitizer assembled into the liquid crystal display module according to a first embodiment of the present invention.

FIG. 5 is a plane view of a digitizer assembled into the liquid crystal display module according to a first embodiment of the present invention. As shown in FIG. 5, the first embodiment of the present invention includes a liquid crystal display module 10, a support main 13 provided at a rear portion of the liquid crystal display module 10, a printed circuit board (PCB) 45 having a driving circuit for driving the liquid crystal display module 10 and being connected to a corner of the liquid crystal display module 10 by a tape carrier package (TCP) 14, and a fixing device 41 for inserting a digitizer between the support main 13 and the PCB 45. The PCB 45 is divided into a PCB 45a having a driving circuit for driving data lines, and a PCB 45b having a gate line driving circuit for driving gate lines. As mentioned in the description of the related art, both the PCB 45a and the PCB 45b are electrically connected to the liquid crystal display module 10 by a TCP (not shown).

The fixing device 41 for inserting the digitizer not only protects the exterior of the digitizer 40 but also improves the problems of lifting the PCB 45 and the TCP when inserting the digitizer 40 and having the digitizer 40 contact the PCB 45 and the TCP during the inserting process. The fixing device 41 for inserting the digitizer fixed at the LCM 10 receives the digitizer 40.

Therefore, the fixing device 41 for inserting the digitizer should have durability and thermal resistance to resist the heat generated from the LCM 10 and the PCB 45. Also, the fixing device 41 should be formed of a light and thin material for lightweight and slim size.

Among the various materials satisfying the condition of the fixing device 41 for inserting the digitizer, and polyethylene terephthalate (PET) film is suitable in price and productivity. The PET film is used in the fixing device 41 for inserting the digitizer, since PET has the characteristics of durability, thermal resistance, and economical efficiency.

Also, PET has high productivity and can be formed in various forms. The PET film having moderate elasticity is easy to be assembled and suitable for fabricating a light and thin fixing device 41 for inserting the digitizer. Since the material of the fixing device 41 for inserting the digitizer is not limited only to PET, any material satisfying the required conditions can be used.

Figure 6A:
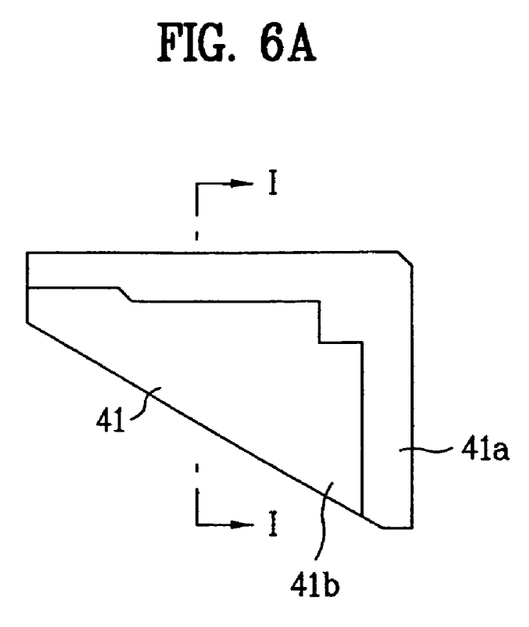
FIG. 6A is an enlarged view of the fixing device for inserting the digitizer according to the first embodiment of the present invention.
Figure 6B:
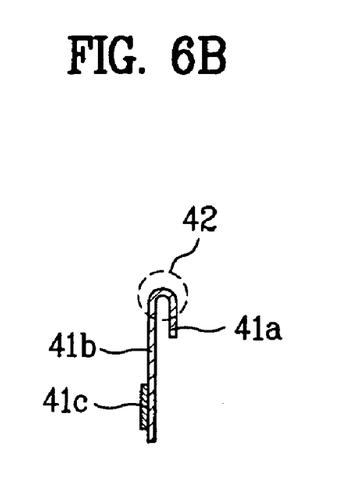
FIG. 6B is a cross-sectional view taken along line I-I of FIG. 6A.

FIG. 6A is an enlarged view of the fixing device for inserting the digitizer according to the first embodiment of the present invention, and FIG. 6B is a cross-sectional view taken along line I-I of FIG. 6A. The fixing device 41 for inserting the digitizer having a receiving portion for inserting the digitizer 40 is formed in a pocket shape for more easily inserting the digitizer 40. The bottom surface of the fixing device 41 for inserting the digitizer contacting the support main 13 of the LCM 10 can be formed to occupy the entire surface. However, a corner of the surface that does not contact the PCB 45 can be formed in a diagonally cut shape, as shown in FIG. 6A.

The top surface of the fixing device 41 for inserting the digitizer can be formed along the surface where the PCB is provided, so as to prevent the PCB 45 from contacting the digitizer 40. More specifically, the fixing device 41 for inserting the digitizer includes a covering part 41a formed at an area covered by the PCB 45 and a floor part 41b contacting the rear portion of the support main 13.

The fixing device 41 for inserting the digitizer is not limited to the above-described structure. Different forms may be used if the PCB 45 and the digitizer 40 are not in contact with each other.

It is necessary that the fixing device 41 for inserting the digitizer is adhered to the rear portion of the support main 13 of the LCM 10, and it is desirable that a double-faced tape 41c is used to stably fix the fixing device 41 for inserting the digitizer. That is, the entire device can be maintained to have a slim thickness by adhering the fixing device 41 for inserting the digitizer with the double-faced tape 41c as compared to fixing it with screws. And, while inserting the digitizer 40, the fixing device 41 for inserting the digitizer is fixed to the support main 13 and the digitizer can be installed safely.

Although the bottom surface of the fixing device 41 for inserting the digitizer is fixed to the rear surface of the support main 13 by the double-faced tape as a fixing method, other fixing methods may be used to the above-described method. Also, the top surface of the fixing device 41 for inserting the digitizer contacting the PCB 45 can be adhered by using the double-faced tape or by using other adhering methods in order to more stably fix the PCB 45.

As shown in FIG. 6B, an end surface 42 of the fixing device 41 for inserting the digitizer contacting the PCB 45 is formed in a smooth U-shape form so as to prevent the PCB 45 from being damaged when a corner of the end surface 42 is formed sharp.

The fixing device 41 for inserting the digitizer receiving the digitizer 40 is provided between the support main 14 and the PCB 45 so as to maintain constant electromagnetic transmission characteristics.

That is, the PCB 45 should be provided on the rear surface of the digitizer to prevent a signal from being distorted by the sine wave magnetic flux being disturbed by the PCB 45, when the PCB 45 is provided on the front surface of the digitizer 40.

Figure 7A:
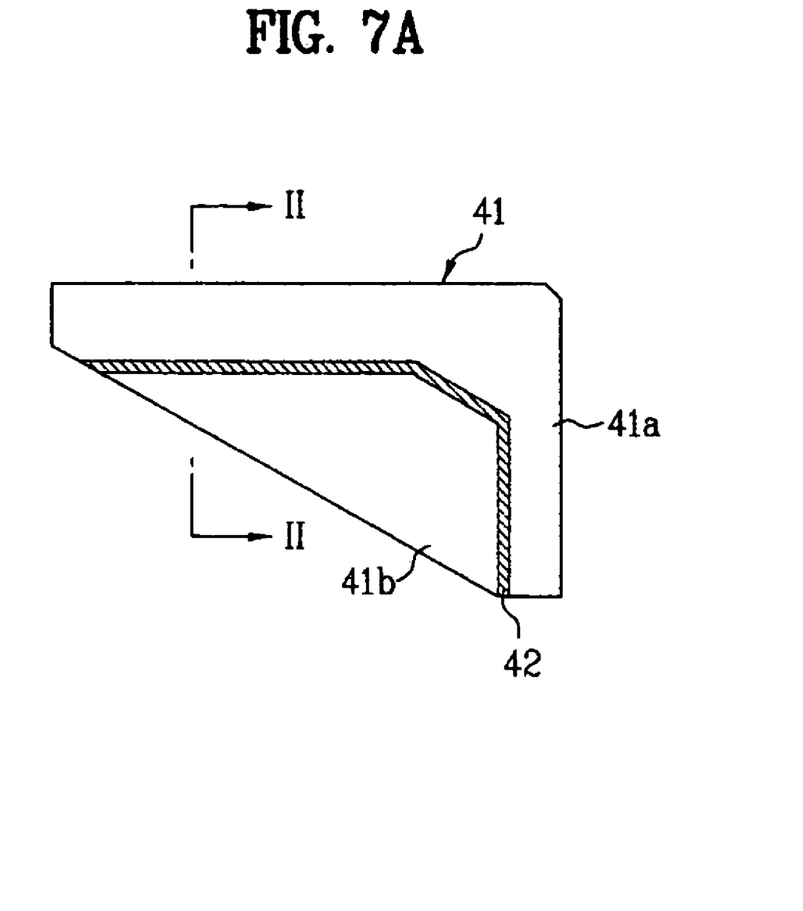
FIG. 7A is an enlarged view of the fixing device for inserting the digitizer according to a second embodiment of the present invention.

Meanwhile, a second embodiment of the present invention is as follows. FIG. 7A is an enlarged view of the fixing device 41 for inserting the digitizer according to the second embodiment of the present invention, and FIG. 7B is a cross-sectional view taken along line II-II of FIG. 7A.

Figure 7B:
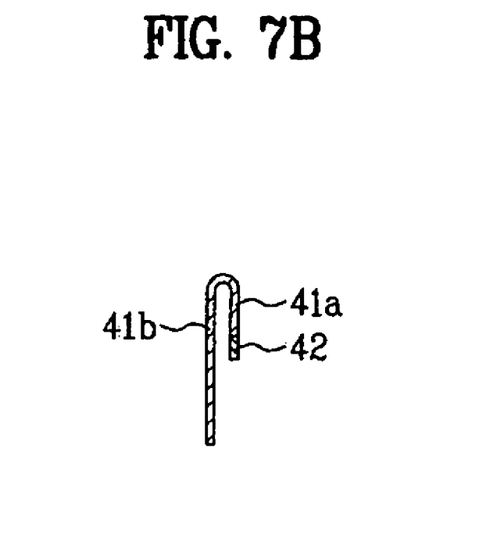
FIG. 7B is a cross-sectional view taken along line II-II of FIG. 7A.

Referring to FIGS. 7A and 7B, the covering part 41a of the fixing device 41 has a specific color on the surface where the PCBs are located. A specific color of the covering part 41a is to solve the problem that the receiving position of the digitizer cannot be easily located when inserting the digitizer 40 if the colors of the covering part 41a and the floor part 41b are the same. When the digitizer 40 is inserted between the PCB 45 and the covering part 41a instead of into the receiving portion, the PCB 45 can be damaged. Therefore, by enabling the position to be easily located, product deficiency can be reduced.

Thus, the fixing device 41 is coated to have a specific color along the outer periphery of the covering part 41a. In other words, for a simple and speedy printing method, it is desirable that only the outer periphery 43 of the covering part 41a is colored instead of coloring all parts of the covering part 41a.

To achieve the object, the covering part 41a and the floor part 41b of the fixing device 41 are coated with different colors. As mentioned above, printing with a certain color is more necessary when the fixing device 41 is formed of a transparent film.

The covering part 41a of the fixing device 41 is formed to be spaced apart from the surface covered by the PCB 45 so as to prevent the inserted digitizer 40 from contacting the PCB 45. In this case, the outer periphery 42 of the covering part 41a is rounded to simplify the structure of the fixing device 41 in order to ensure a more effective productivity. Therefore, instead of forming a plurality of bends on the covering part 41a corresponding to the shape of the PCB 45, as shown in FIG. 7A, the outer periphery 42 of the covering part is rounded along the surface having the printed circuit board 45 provided thereon.

Hereinafter, an assembling process of the fixing device 41 of the digitizer will be explained. As shown in FIGS. 1 and 5, with reference to the expanded view, the bottom of the support main 13 is coupled to a top case 20 covering the outer periphery of the liquid crystal display panel 11, and the TCP and the PCB 45 being adhered to a corner of the liquid crystal display panel 11 are covered by the top case 20 at a side of the LCM 10 so as to cover the bottom corner of the LCM 10.

Thereafter, the PCB 45 is adhered closely to and fixed on the bottom surface of the support main 13 on the rear surface of the LCM 10 by a plate bottom or a system backside. Therefore, as shown in FIG. 5, the fixing device 41 for inserting the digitizer is fixed between the support main 13 and the PCB 45 before the top case covers the PCB 45 and the TCP covering the bottom surface of the support main 13. Thereafter, the PCB 45 is closely adhered and fixed by the plate bottom supporting the PCB 45 at the bottom of the system.

The digitizer 40 is inserted after the assembling process of the fixing device 41 and the LCM 10. The fixing device 41 being closely adhered has a narrow space for receiving the digitizer 40, thereby avoiding a direct contact with the PCB 45 when inserting the digitizer 40. The PCB 45 can be fixed at the upper portion of the fixing device 41 and is not necessarily lifted up, thereby preventing the PCB 45 and the TCP from being damaged.

Therefore, a polyethylene terephthalate (PET) film is added as a fixing device 41 between the support main 13 and the PCB 45, in order to reduce product deficiency and to secure reliability of the LCM with an improved work and a stable structure.

Meanwhile, as shown in the first and second embodiments of the present invention, although the digitizer fixing device is provided-between the support main and the PCB, the PCB is connected to the liquid crystal display panel through the TCP and the PCB is lifted into the air from the rear surface of the support main by the restoring force generated from the elasticity of the TCP. Therefore, when a strong shock is applied to the liquid crystal display device having the digitizer or when the lifted PCB is touched during the manufacturing process, the TCP or the PCB may be damaged, and the liquid crystal display device may become deficient.

The third embodiment of the present invention includes a fixing board having a first end fixed at the top case near the PCB and projected toward the rear portion of the liquid crystal display module for fixing the PCB and fixing the digitizer by a plastic deformation to prevent the support main from being lifted into the air from the rear surface of the support main.

Figure 8:
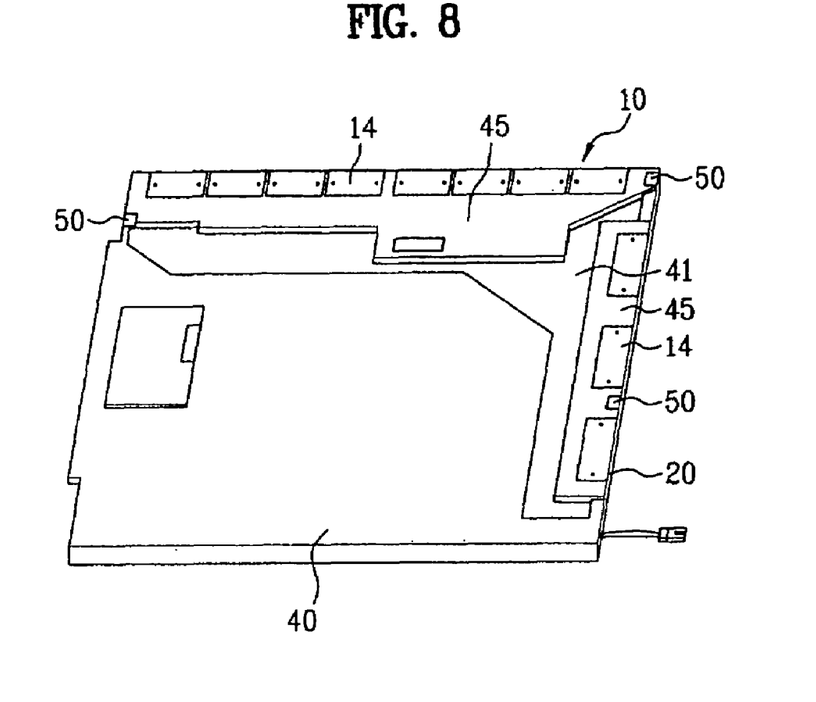
FIG. 8 is a plane view of the digitizer provided at the rear side of the liquid crystal display device and the PCB fixed by a fixing board according to a third embodiment of the present invention.

The liquid crystal display device according to the third embodiment of the present invention will now be explained with reference to the accompanying drawings. FIG. 8 is a plane view of the digitizer provided at the rear side of the liquid crystal display device and the PCB fixed by the fixing board. As shown in FIG. 8, the liquid crystal display device having the digitizer of the present invention includes a LCM 10, a top case 20 as a support frame of the LCM 10, a fixing device 41 for inserting the digitizer, a plurality of PCBs 45, and a PCB fixing board 50.

The fixing device 41 for inserting the digitizer formed in a pocket shape has a thin receiving unit for receiving the digitizer 40 and is provided between the support main at the rear portion of the PCB 45 and the LCM 10 for preventing the PCB 45 and the TCP 14 from being damaged while inserting the digitizer as explained in the first and second embodiments. The fixing device 41 for inserting the digitizer further includes a fixing board having a first end fixed at the top case near the PCB and projected toward the rear of the liquid crystal display module to a predetermined length for fixing the PCB by a plastic deformation after fixing the digitizer in order to prevent the support main from being lifted into the air from the rear surface of the support main.

Figure 9:
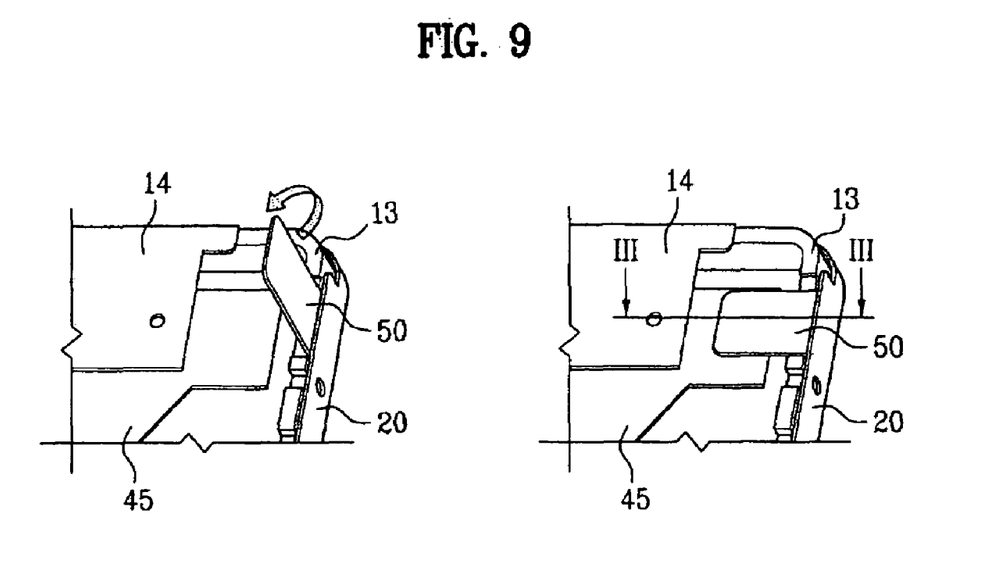
FIG. 9 is a plane view of the fixing board being bent according to the third embodiment of the present invention.

FIG. 9 is a plane view of the fixing board being bent according to the third embodiment of the present invention. In reference with FIGS. 8 and 9, the PCB 45 and the liquid crystal display panel are connected to the TCP 14. The TCP 14 covering the bottom corner of the support main 13 is folded at the rear portion of the support main 13 and a side is covered by the top case 20. The fixing device 41 for inserting the digitizer is provided between the support main 13 and the PCB 45 at the rear portion of the support main 13. The assembling process of the LCM 10 is completed after inserting the digitizer 40 into the fixing device 41.

Thereafter, the LCM 10 having the digitizer 40 is coupled with the system. After the LCM 10 is assembled, the PCB 45 is provided at the rear portion of the support main 13. The TCP 14 is formed in an elastic film, and the PCB 45 is lifted into the air from the rear portion of the support main 13 due to the elasticity recovery of the PCB. Therefore, when shock is applied to the liquid crystal display device having the digitizer 40, the PCB 45 lifted into the air during the manufacturing process is contacted, thereby damaging the TCP 14 or the PCB 45.

Therefore, the present invention includes a fixing board having a first end fixed at the top case near the PCB 45, the fixing board projected toward the rear of the liquid crystal display module at a predetermined length for fixing the PCB and fixing the digitizer by plastic deformation to prevent the support main from being lifted into the air from the rear surface of the support main.

The digitizer is inserted into the fixing device 41 for inserting the digitizer and each PCB 45 is provided along a long side at the upper portion of the LCM 10 and a short side on a side of the LCM 10. The fixing boards 50 are provided on both sides of the PCB 45 or in spaces between the PCB 45 and the TCP 14 connecting the PCB 45 to the liquid crystal display panel. The fixing boards 50 formed in a ']' shape by a plastic deformation after being bent by pressure, the fixing boards 50 function to press the PCB 45. The fixing board 50 includes a thin board for a flexible bending. The bent fixing board 50 presses the PCB 45 and prevents the PCB 45 from being lifted into the air. If necessary, the position and the number of the fixing board 50 can be changed as aforementioned.

The fixing board 50 of the present invention and the top case having a first end of the fixing board includes a conductive material. In general, a piece of metal formed in a thin board form can be bent and remains in the bent form by a plastic deformation after being bent. Therefore, the fixing board 50 of the present invention includes aluminum or stainless steel (SUS).

As shown in FIG. 9, the fixing board 50 is pressed and bent by handwork or an automatic equipment. The PCB 45 is prevented from being lifted into the air by pressing a side of the PCB 45. When the fixing board 50 is bent, the bending should be guided for accurately pressing the PCB 45. Therefore, a projected portion of the support main 13 is provided for guiding the bending of the PCB 45 at a position where the fixing board 41 is bent in the present invention.

Figure 10:
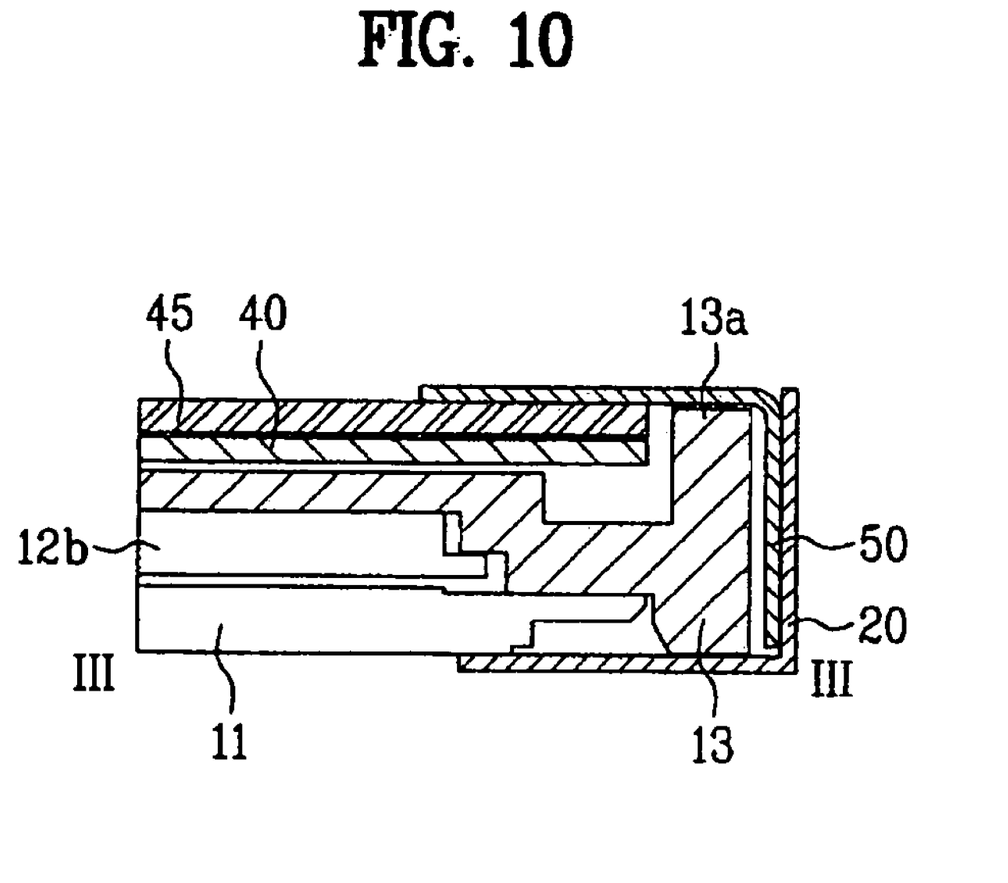
FIG. 10 is a cross-sectional view taken along line III-III of FIG. 9.

FIG. 10 is a cross-sectional view taken from the line III-III of FIG. 9. The projected portion 13a of the support main 13 functions as a support of a lever and guides the exact bending of the fixing board 50 at a position where the fixing board 50 is bent.

Also, the present invention provides a more effective grounding system for stably fixing the PCB as mentioned above. Generally, the PCB 45 includes accumulated circuits, and an electromagnetic wave is generated from the circuits. The PCB requires a grounding structure to prevent misoperations of the circuits. Each PCB 45 has a grounding unit electronically connected to a ground system of an outer system. Therefore, the present invention includes the more effective grounding system of the PCB 45 by using the fixing board 50. That is, the fixing board 50 bent and contacting the grounding unit of the PCB 45 includes a connecting structure for an electrical grounding between the PCB 45 and the top case 20. As shown in FIG. 9, the fixing board 50 contacts a first end of the PCB 45 after the fixing board 50 is bent. At this time, the grounding unit is provided at the PCB 45 of the first contacted end. Therefore, each grounding unit 51 of S, G-PCB 45 is provided near the top case 20, the first end of the fixing board 50 is fixed to the top case, and the fixing board 50 is contacted with the grounding unit 51 by being bent.

Furthermore, the grounding unit 51 of the PCB 45 contacting the fixing board 50 is electrically connected to the fixing board 50. The first end of the fixing board 50 is connected to the top case 20 including a metal conductor so that the PCB 45 and the top case 20 are electrically connected for an electrical grounding. Thereafter, the top case 20 is grounded with the system case to form the entire grounding structure of the system.

Here, the fixing board 50 and the top case 20 are formed as a single body. That is, when manufacturing the top case 20, the fixing board 50 is formed simultaneously. In general, the top case 20 includes metal and the fixing board 50 includes metal as well. On the other hand, when the fixing board 50 and the top case are produced separately, the fixing board 50 is welded to an inner surface of the top case 20. It is desirable that a spot welding is used for the welding.

Hereinafter, a fabrication process of the liquid crystal display device having a digitizer will be explained according to the present invention. The fabrication process of the liquid crystal display device includes providing a plurality of fixing boards 50 projected through the rear surface of the LCM 10 on the inner surface of the top case 20 near the PCB 45 of the LCM 10, providing the fixing device 41 for inserting a digitizer between the support main at the rear surface of the LCM 10 and the PCB 45, inserting the digitizer 40 into the fixing device 41 and pressing the fixing board 50 to change the shape into a ']' shape by a plastic deformation so as to press and fix the PCB 45.

Hereinafter, the fabrication process of the liquid crystal display device will be explained in detail. As mentioned above, the length of the process is reduced when the PCB fixing board 50 and the top case 20 are provided as a single body, as opposed to when the fixing board 50 is fabricated separately and adhered to the top case 20. Therefore, when fabricating the top case 20, the fixing board becomes integrated.

The fixing device 41 for inserting the digitizer is adhered to the rear surface of the support main 13 by using such as a double-faced tape before assembling the LCM 10. According to the assembling order, it is not necessary to lift the PCB 45 in order to insert the digitizer 40 between the rear surface of the support main 13 and the PCB 45. The PCB 45 is pressed by bending the fixing board 50 with pressure in order to prevent the PCB 45 from being unfastened by the elasticity of the TCP 14.

The composition of the fixing method of pressing the PCB 45 by pressing the fixing board 50 is similar to the composition of the liquid crystal display device having the digitizer 40, and so a detailed explanation thereof will be omitted for simplicity.

As mentioned above, the liquid crystal display panel according to the present invention has the following advantages. First, no extra space is needed for screwing the digitizer to the LCM, and the digitizer is provided for securing the lightweight and field emission display of the liquid crystal display device.

Also, the problem of lifting the PCB in order to insert the digitizer between the LCM and the PCB is solved so as to prevent the PCB and the TCB from being damaged. Therefore, product deficiency is prevented prior to the fabrication. The liquid crystal display device can stably fix the digitizer while maintaining lightweight and field emission display by using the fixing device such as a PET film.

In addition, the receiving unit of the covering part of the fixing device is printed with a specific color for distinguishing the receiving unit and securing an exact insertion of the digitizer so as to reduce product deficiency.

Furthermore, the PCB is pressed and fixed stably by the PCB fixing board to prevent the PCB and the TCP from unfastening by the elasticity of the TCP after the digitizer is provided. Therefore, during the manufacturing process, the PCB or TCP is prevented from being heavily shaken and damaged after being hit by an external object.

It will be apparent to those skilled in the art that various modifications and variations can be made in the liquid crystal display device having the digitizer and the method for fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
   a liquid crystal display device module;
   a printed circuit board located in close proximity to a support main of the liquid crystal display device module; and
   a fixing device for inserting a digitizer to fix the digitizer, wherein the fixing device has a floor part and a convering part that each receives an edge of the digitizer, wherein the floor part adheres to a rear surface of the support main, and wherein the digitizer is inserted between the floor part and the covering part.

2. The liquid crystal display device of claim 1, wherein the fixing device is formed of a polyethylene terephthalate film.

3. The liquid crystal display device of claim 1, wherein the fixing device is formed in a thin pocket shape.

4. The liquid crystal display device of claim 1, wherein the fixing device is adhered by a double-faced tape so as to be fixed at a bottom surface of the support main.

5. The liquid crystal display device of claim 1, wherein the fixing device is provided between the support main at a rear portion of the liquid crystal device module and the printed circuit board.

6. The liquid crystal display device of claim 1, wherein the fixing device has a U-shaped end portion in contact with the printed circuit board.

7. The liquid crystal display device of claim 1, wherein the covering part is coated with a color different from the floor part.

8. The liquid crystal display device of claim 7, wherein the color is printed at an edge of the covering part.

9. The liquid crystal display device of claim 1, wherein the covering part and the floor part of the fixing device are formed as a single body.

10. The liquid crystal display device of claim 1, wherein the covering part of the fixing device prevent the inserted digitizer from contacting the printed circuit board.

11. The liquid crystal display device of claim 8, wherein the edge of the covering part is rounded along the surface of the printed circuit board.

12. The liquid crystal display device of claim 1, wherein the floor part of the fixing device is adhered by a doubledfaced tape and fixed at the rear side of the support main.

* * * * *